UNITED STATES PATENT OFFICE.

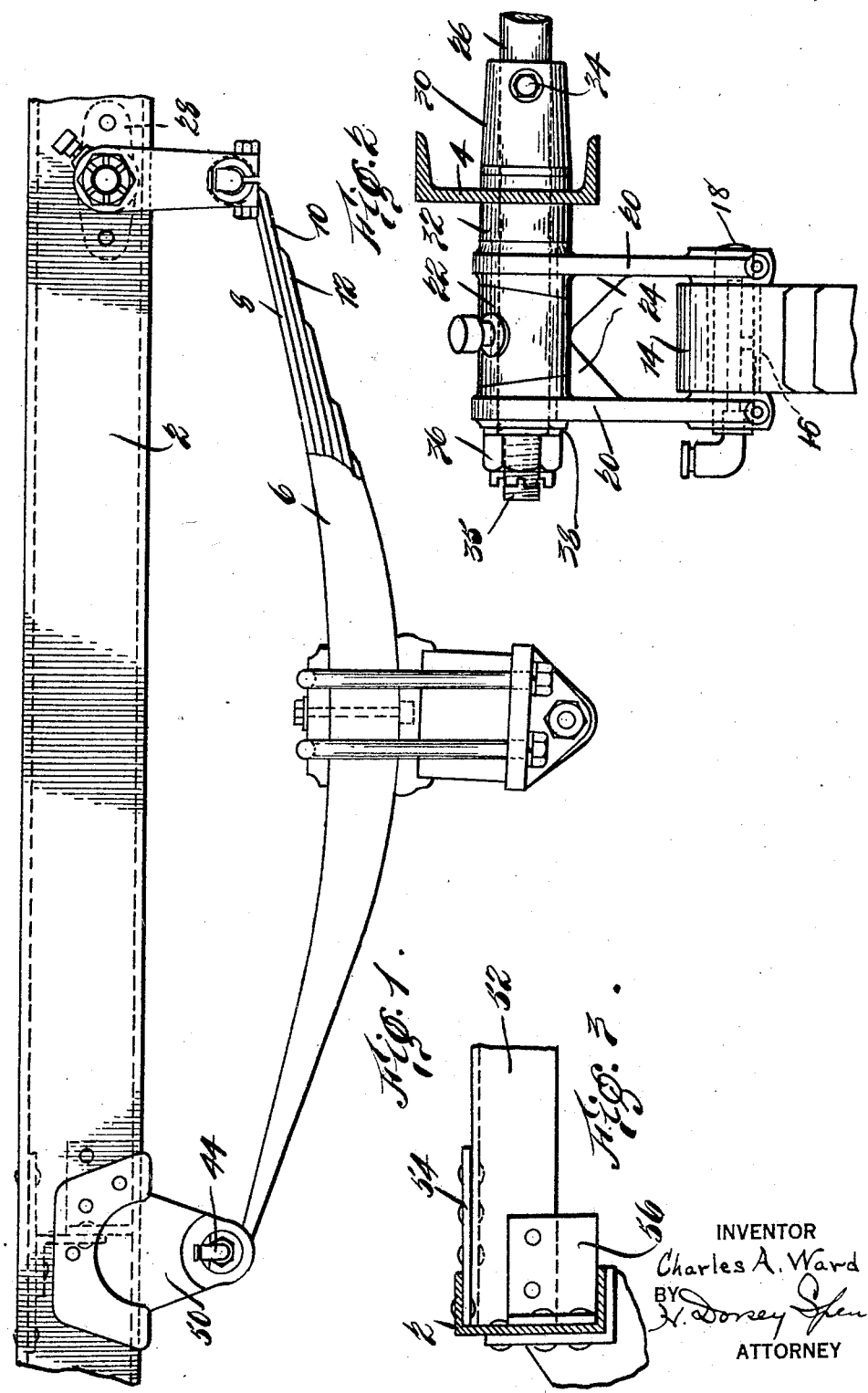

CHARLES A. WARD, OF MOUNT VERNON, NEW YORK.

MOTOR-VEHICLE CHASSIS.

1,410,231.   Specification of Letters Patent.   Patented Mar. 21, 1922.

Application filed April 3, 1919. Serial No. 287,162.

*To all whom it may concern:*

Be it known that I, CHARLES A. WARD, a citizen of the United States, residing at Mount Vernon, county of Westchester, State of New York, have invented certain new and useful Improvements in Motor-Vehicle Chassis, of which the following is a clear, full, and exact description.

This invention relates to motor vehicle chassis and particularly to vehicle chassis in which the supporting springs are arranged substantially parallel to the side members of the vehicle frame, although it will be understood that many features of the invention are applicable to motor vehicle chassis and to spring arrangements of other types.

In motor vehicle chassis in which the supporting springs extend lengthwise of the vehicle and are arranged substantially parallel to the side frame members of the vehicle frame, it has been customary heretofore to provide independent spring supports upon each side frame member. If the spring is offset to one side of the vertical plane in which the side frame member of the vehicle is located, the result of this arrangement has been to impart a twisting strain to the frame member, particularly when the shocks transmitted from the springs to the frame members are those resulting from side swaying of the vehicle. Such connections have also been defective in that the whole strain of the connection has come usually upon the web portion of the usual channel member, of which the side frame portion of the vehicle is constituted, this web portion being usually the weakest part of the frame member.

An object of the present invention is to provide a vehicle chassis construction in which not only is the tendency to a twisting strain upon the side frame members of the vehicle frame substantially eliminated, but in which also the springs themselves are substantially confined to flexion in vertical planes, thereby eliminating some of the causes of spring breakage and other difficulties.

Other objects and important features of the invention will appear from the following description and claims when considered in connection with the accompanying drawings, in which—

Fig. 1 is a side elevation of a portion of one side of a motor vehicle frame having incorporated therein the spring support of the present invention;

Fig. 2 is a section through one side of the vehicle frame just behind the rear spring supporting shackle, showing the rod which extends across the vehicle frame broken away;

Fig. 3 is a section through the frame just behind the front spring shackle, showing the cross brace bar of the frame.

The vehicle frame, a portion of which only is shown in the drawings, preferably comprises side frame members 2 formed preferably of channel bars, with the web portions 4 in vertical planes, the side frame members being connected at their ends by end members (not shown), of a similar cross section, and the whole frame being connected to the vehicle axles by four springs of which only one is shown, the illustrated spring being of the type preferably used in connecting the vehicle frame to the rear axle, there being a corresponding spring attached to the side frame member upon the other side of the vehicle.

It has been customary heretofore to provide independent spring supports upon each side frame member. When the spring has been located directly below the side frame member, that is, in substantially the same vertical plane as the web portion 4 of the side frame member, such an arrangement of the spring supports, although not completely satisfactory, has not been so objectionable as when the spring support has been offset to one side of this plane. In those constructions in which the spring support has been offset to one side, difficulty has been experienced by reason of the marked tendency of the vehicle to side swaying and also by reason of the tendency to frame distortions from the road shocks transmitted through the spring.

As hereinabove suggested, one of the principal objects of the present invention is to provide a vehicle chassis construction in which the tendency to a twisting strain upon the side frame members is substantially eliminated and in which, furthermore, the springs themselves are substantially confined to flexion in vertical planes, thus substantially eliminating the tendency of the vehicle to side swaying.

In the illustrated construction, this end is attained by providing spring supports which are substantially rigid from one side of the vehicle frame to the other and which are so constructed that the springs upon the two sides of the vehicle are substantially confined to flexion in parallel vertical planes. The illustrated vehicle spring 6, which is made up of a plurality of leaves, 8, 10, 12, etc., has its upper leaf 8 provided at its ends with bearing loops 14, one of which embraces a bushing 16 upon a bearing pin or bolt 18, carried by the two arms 20 of a spring shackle having a hub portion 22 integral with said arms and also connected thereto by reinforcing webs 24. The hub 22 of the spring shackle is mounted upon the outer end of a shaft 26 which extends across the vehicle frame from one side frame member to the other and also extends through the web portion 4 of each side frame member to provide a bearing support for the hub 22 of each spring shackle upon the outside of each frame member. Riveted or bolted to the web portion 4 of each side frame member is a bracket 28 having an integral boss 30 projecting upon the inside of the vehicle frame and a somewhat similar boss 32 projecting to the outward side of the web portion 4 of the side frame member, bosses 30 and 32 providing an elongated support upon each side frame member for the shaft 26 which is preferably secured against rotation by a screw 34 threaded through each of the bosses and entering a recess in the shaft 26. At each of its outer ends, the shaft 26 is reduced and threaded, as at 35, to receive a nut 36 which clamps a bearing washer 38 against a shoulder formed by reducing the shaft as stated, thus confining the hub 22 upon the shaft between said washer and the boss 32 for free swinging movement on the shaft 26.

From the foregoing description, it will be seen that twisting strains upon the webs 4 of the side frame members 2 are substantially eliminated, since any shock transmitted to the shaft 26 through the spring shackle and its bearing hub 22 is distributed between the two sides of the vehicle frame by reason of the fact that the shaft 26 extends from one side of the frame to the other and is rigidly connected to the two sides. The resistance of the reinforced spring support construction against twisting movement thus tends not only to eliminate the twisting strain upon the vehicle frame but also to confine the spring to movement in substantially a vertical plane, thus incidentally preventing side swaying of the vehicle.

The spring 6 is provided at its other end with a bearing loop 14, not shown, similar to the bearing loop illustrated, with a bearing bushing 16 and bolt 18, similar to those illustrated. The bearing support for this end of the spring comprises a rigid depending bracket 50 attached to the side frame member, the vehicle frame being reinforced at the point of attachment of the front ends of the springs 6 by a cross frame member 52 connected to the side frame members 2 by reinforcing braces or webs 54, and angle pieces 56, or by enlargement of the spring eye and use of the bar construction already described, the frame thus being reinforced against any tendency to twisting strains at the forward ends of the springs as well as at the rear ends.

Having thus described my invention, what I desire to claim and secure by Letters Patent is:

1. In a vehicle chassis, the combination with channeled side frame members having vertical web portions, of frame stiffening and spring supporting means comprising a shaft extending across the vehicle frame and through the web portions of said side frame members, brackets having bases extending along said side frame webs and rigidly secured thereto and having bosses extending along the shaft upon the inner sides of said webs and rigidly secured to said shaft, said shaft having spring supporting bearings at its ends.

2. In a vehicle chassis, the combination with channeled side frame members having vertical web portions, of frame stiffening and spring supporting means comprising a shaft extending across the vehicle frame and through the web portions of said side frame members, brackets having bases extending along said side frame webs and rigidly secured thereto and having bosses extending along the shaft to both sides of said webs and rigidly secured to said shaft, said shaft having spring supporting bearings at its ends.

3. In a vehicle chassis, the combination with channeled side-frame members having vertical webs, of supports for springs which extend lengthwise of said chassis in substantial parallelism to said side-frame members, said supports comprising a shaft extending across said frame and through the web portions of said channeled side members, reinforcing brackets anchoring said shaft upon said side members and in which brackets said shaft is rigidly secured, said shaft being provided upon its ends outside said side members with bearings for spring shackles or spring eyes, and spring shackles confined upon said shaft ends for movement only co-axial with said shaft.

4. In a vehicle chassis, the combination with the channeled side-frame members having vertical webs, of vehicle springs arranged below, at one side of and in substantial parallelism to said side-frame members, means for connecting said springs to said side-frame members, comprising a stationary bearing bracket at one end of each spring and a pivoted shackle at the other end of each spring, a shaft upon the ends of which said spring shackles are pivoted, extending across said frame and preferably through said web portions thereof and having supporting brackets connected to the web portions of said frame and in which brackets said shaft is rigidly secured, and a frame-stiffening crossbar extending across said frame between said stationary bearing brackets.

Signed at Mount Vernon, N. Y., this 27th day of March, 1919.

CHARLES A. WARD.

Witness:
  ALMA BOCKHORST.